(12) United States Patent
Johnson

(10) Patent No.: US 7,096,483 B2
(45) Date of Patent: Aug. 22, 2006

(54) DEDICATED CHANNEL FOR DISPLAYING PROGRAMS

(75) Inventor: Carolynn Rae Johnson, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 565 days.

(21) Appl. No.: 09/742,621

(22) Filed: Dec. 21, 2000

(65) Prior Publication Data

US 2002/0083448 A1     Jun. 27, 2002

(51) Int. Cl.
*G06F 3/00* (2006.01)
(52) U.S. Cl. .......................... 725/46; 725/53
(58) Field of Classification Search ............... 725/46, 725/47, 53; 715/745
See application file for complete search history.

(56) References Cited

U.S. PATENT DOCUMENTS

| | | | |
|---|---|---|---|
| 5,867,226 A * | 2/1999 | Wehmeyer et al. ........... 725/46 |
| 5,929,850 A | 7/1999 | Broadwin et al. |
| 6,133,909 A * | 10/2000 | Schein et al. ............... 345/721 |
| 6,163,316 A * | 12/2000 | Killian ....................... 345/721 |
| 6,216,264 B1 | 4/2001 | Maze et al. |
| 6,564,378 B1 * | 5/2003 | Satterfield et al. ............ 725/40 |
| 6,642,939 B1 * | 11/2003 | Vallone et al. .............. 345/721 |
| 6,925,650 B1 * | 8/2005 | Arsenault et al. ............. 725/39 |
| 2002/0073425 A1 * | 6/2002 | Arai et al. .................... 725/44 |

FOREIGN PATENT DOCUMENTS

| EP | 0774866 | 4/2002 |
|---|---|---|
| EP | 0774868 A | 8/2002 |
| WO | WO 96/17473 | 6/1996 |

* cited by examiner

*Primary Examiner*—Chris Kelley
*Assistant Examiner*—James Sheleheda
(74) *Attorney, Agent, or Firm*—Joseph J. Laks; Robert D. Shedd; Reitseng Lin

(57) ABSTRACT

A system and method for processing program guide information are described. A user processing request information is selected or entered by the user. This allows the user, for example, to request the system to suggest a program, or to perform a search of the program guide information based on user-entered information. The program guide information is then processed based on the entered user processing request information. The processed result is then displayed in a dedicated channel.

16 Claims, 8 Drawing Sheets

```
CH 150                    PROGRAM GUIDE                              7:05pm

MOVIE TITLE:  ZULU
                          STARRING:     STANLEY BAKER & MICHAEL CAINE
                          PRODUCER:     STANLEY BAKER
         7:00pm           RATING:       PG-13 (VIOLENCE)
                          THEME:        ACTION / ADVENTURE
                          REVIEW:       ★★★1/2
HBO   OTHER PEOPLE'S MO
102                       PLOT:
CBS   EVENING        F        A VASTLY OUTNUMBERED COMPANY OF
106   NEWS           T    BRITISH SOLDIERS IN LATE 19TH CENTURY SOUTH
                          AFRICA DEFENDS AN ISOLATED OUTPOST AGAINST
UPN   STAR TREK: VOYAG    AN ATTACK BY 40,000 ZULU WARRIORS         R
113

CINE  CINE SATURDAY NIGHT MOVIE:   ZULU
210

CNN   PRIME       BOTH          RELIABLE         WORLD
305   NEWS        SODES         SOURCES          NEWS

USA   COUNTER STRIKE              QUANTUM LEAP
422

MORE     MOVIES     SPORTS     OTHER     ALL     EXIT
```

FIG. 1

| NAME | COUNT | TYPE | DATE | LOCK |
|---|---|---|---|---|
| MOVIE | 7 | TOPIC | 11.15.95 | NO |
| COMEDY | 3 | THEME | 11.15.95 | NO |
| DRAMA | 4 | THEME | 09.27.95 | NO |
| THE SIMPSONS | 21 | TITLE | 10.23.95 | YES |
| | | | | |

FIG. 2

VIEWING DEDICATED CHANNEL OPTIONS

○ DON'T SHOW THIS CHANNEL IN THE GUIDE AT ALL.

○ SHOW THIS CHANNEL ONCE IN THE GUIDE.

⬤ SHOW THIS CHANNEL, ALWAYS AT THE TOP OF THE GUIDE

○ SHOW THIS CHANNEL ALWAYS AT THE BOTTOM OF THE GUIDE.

CHOSE WHETHER YOU WANT TO HAVE A VIEWING SUGGESTION CHANNEL IN THE PROGRAM GUIDE, AND WHERE THE CHANNEL SHOULD APPEAR

DEDICATED CHANNEL FOR DISPLAYING PROGRAMS

FIELD OF THE INVENTION

The present invention generally relates to a system and method for processing program information. In particular, the present invention utilizes information from the results of viewing suggestion or a search and displays them in a dedicated channel.

BACKGROUND OF THE INVENTION

The act of selecting a television program to watch has become more complicated in that the number of available channels has increased dramatically. For example RCA® DSS® direct broadcast satellite receivers provide more than 100 channels to choose from.

A user who wants to see "what's on" may consult a television schedule printed in his local newspaper in the hope that he would eventually find a program which sparked his interest. Such a practice may work well when there are only a few television channel schedules to examine, however, it is unlikely that a viewer would be able to examine the complete schedules for more than 100 television channels, just to see "what's on" at a given time. Such a task would be daunting even if all of the programs were to be listed by category. A viewer may find that there are only a few programs of interest to him out of the vast number of available programs. That is, the chaff outnumbers and tends to hide the wheat. Consequently, it is felt that as the number of channels increases, the chances of successfully locating a desirable program in a short time becomes more and more unlikely.

Wehmeyer et al., U.S. Pat. No. 5,867,226, issued on Feb. 2, 1999, describes an apparatus for searching for specific television programs which satisfy certain criteria concerning a user's viewing preferences. Upon successful conclusion to the search, the apparatus generates a list of such television programs in order to predict for the viewer certain programs which may be of interest.

Also, in Maze, et al., U.S. application Ser. No. 08/687,285 (allowed on Oct. 24, 2000), an apparatus is provided for searching program listing for specific user-entered information, and the apparatus notifies the viewer of the availability of the programs by highlighting found programs within the program guide.

SUMMARY OF THE INVENTION

A system and method for processing program guide information are described. A user processing request information is selected or entered by the user. This allows the user, for example, to request the system to suggest a program, or to perform a search of the program guide information based on user-entered information. The program guide information is then processed based on the entered user processing request information. The processed result is then displayed in a dedicated channel.

BRIEF DESCRIPTION OF THE DRAWING

FIG. 1 is an illustration of a screen display, in accordance with an aspect of the invention.

FIG. 2 is an illustration of a screen display showing a viewed item list in accordance with another aspect of the invention.

DETAILED DESCRIPTION OF THE INVENTION

Figure 3:
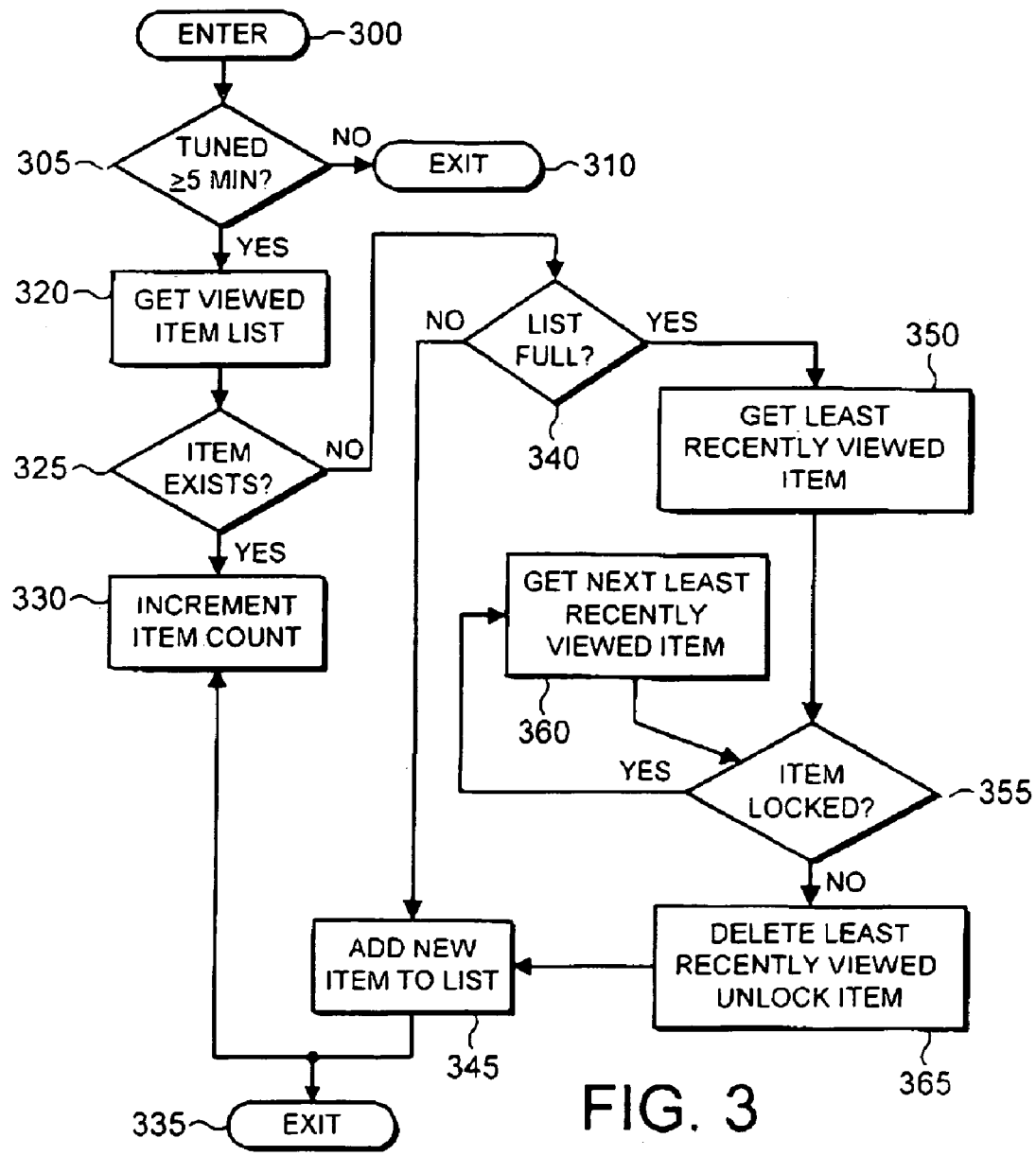
FIG. 3 is a flowchart useful in understanding the invention.

Television systems such as the RCA® DSS® direct broadcast satellite system receive channel guide information for display on the television receivers of subscribers.

FIG. 1 shows a Program Guide screen display 110 produced, for example, by an RCA® DSS® direct broadcast satellite receiver system, manufactured by Thomson Consumer Electronics, Inc. Indianapolis, Ind. A user selects a television program from a Program Guide for viewing, by moving a cursor (via operation of remote control up, down, right, and left, direction control keys, not shown) to a block of the program guide screen display which contains the name of the desired program. When a SELECT key of the remote control is pressed, the current x and y position of the cursor is evaluated to derive virtual channel and program time information. In this example of FIG. 1, a particular television show, CINE SATURDAY NIGHT MOVIE: ZULU has been highlighted for selection by use of the cursor keys on a remote control unit (e. g., 450R of FIG. 4). The highlighting is illustrated by the dark box outlining the title in FIG. 1. Upon pressing the SELECT key, for example, the relevant programming data is transferred to a programming unit or the program is displayed on the screen. Note also that an auxiliary text display 120 is shown. Auxiliary text display 120 provides additional data relating to the highlighted television program. A further use for the data provided by channel guide screen 110 and auxiliary text display 120 will be described below.

FIG. 2 shows a "predictive agent list" or "viewed item list" which may be generated as a screen display 210. Data is automatically stored in this predictive agent list by the apparatus of the invention, whenever a program is watched for a given period of time, for example, 5 or more minutes. In this way, a record is kept of the user's viewing habits so that the apparatus can be guided to make a prediction of which upcoming shows may be of interest to the viewer.

A predictive agent list 210 is illustrated in FIG. 2. In the example of FIG. 2, the viewer has watched 7 movies, (the television program type "movies" is a broad classification known as a "topic"). The last movie was watched on 15 Nov. 1995. Of these 7 movies there were three movies having the theme "comedy", and four movies having the theme "drama". The last comedy was watched on 15 Nov. 1995, and the last drama was watched on 27 Sep. 1995. The viewer also watched 21 episodes of a television program entitled "The Simpsons". Note that an indication of whether each item is locked or unlocked is also stored in the predictive agent list. A viewer may lock an item to prevent the system from automatically deleting that item, if that particular item has not been watched recently. Moreover, the user may edit the viewed item list in order to provide a better filter for the television programs to be predicted (see FIG. 6c).

Automatic loading of the viewed item list is shown in the flowchart of FIG. 3, wherein the routine is entered at step 300. At step 305, a check is made to see if the tuner has been tuned to the current channel for at least five minutes. If not, the routine is exited at step 310. If so, the routine advances to step 320 to get the viewed item list from memory. At step 325, a check is made to see if an item matching the currently viewed television program already exists in the viewed item list. If so, the count of that item is incremented and the routine is exited at step 335. If an item matching the currently viewed television program does not already exist in the viewed item list, then the routine advances to step 340. At step 340 a check is made to see if the list is full. If not, then data indicative of the currently viewed television program is added to the viewed item list, and the routine is exited at step 335. If, at step 340, it was determined that the viewed item list was full, then at step 350 the routine will read the least recently viewed item of the list. At step 355, a check will be made to see if that item is locked. If so, it means that the viewer does not want that item to be deleted, and the routine loops back to step 360 to get the next least recently viewed item from the list. That item will in turn be checked at step 355 to see if it is locked. If not, the routine will advance to step 365 where that item will be deleted to provide free space in the list. The routine will then advance to step 345, add the new item to the list, and exit at step 335.

Figure 5:
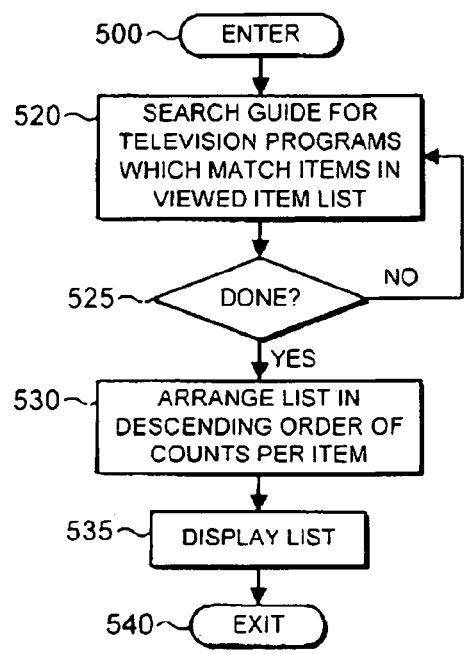
FIG. 5 is a flowchart useful in understanding the invention.

The routine for automatic generation of the predictive list is set forth in FIG. 5. The routine is entered at step 500, and at step 520, a search of the newly received program guide is performed for a match with search terms in the viewed item list of FIG. 2. Note that the additional program descriptive data 120 of FIG. 1 is also to be search for a correspondence with the search terms of FIG. 2. The search routine loops at step 525 until completed. At step 530, the list is weighted for display. The list of items predicted to be of interest to the viewer is then displayed at step 535, and the program exited at step 540.

Figure 6A:
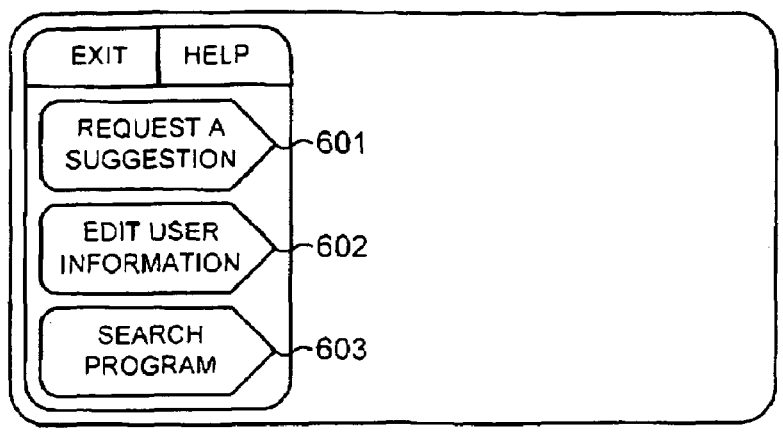
FIGS. 6a–6c are illustrations of screen displays produced in accordance with the invention.
Figure 6B:
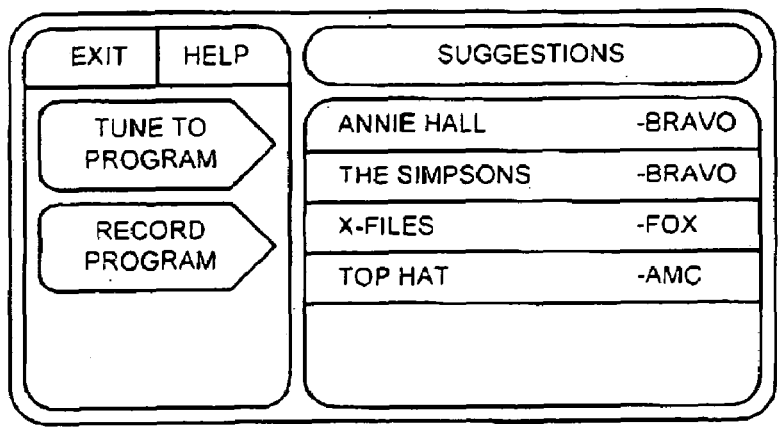
Figure 6C:
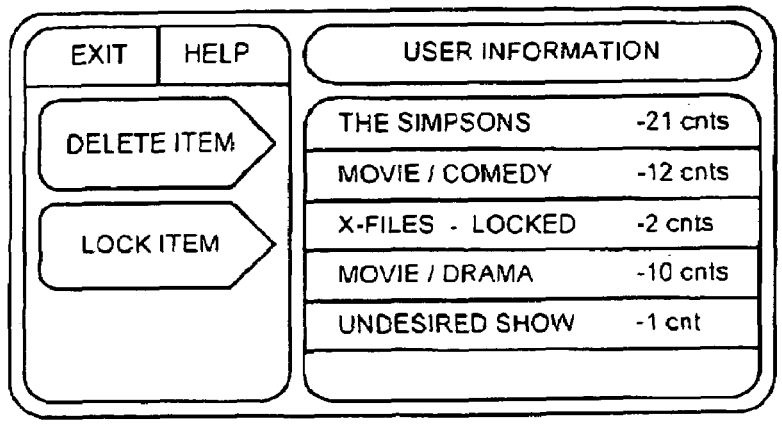

FIGS. 6a–6c show screen displays which enable the user to exercise the features of the invention. Specifically, FIG. 6a is a predictive or search screen accessed for example via the normal hierarchical menu system of a television system. The screen display of FIG. 6a has, for example, three selection choices 701 to 703. These selection choices represent exemplary user processing request information for processing the program or channel guide. Selecting "Request a Suggestion" 701 causes a prediction operation to be performed as described before, and brings up the screen display of FIG. 6b.

FIG. 6b shows the list of suggested programs to the user, for example the movie Annie Hall on the Fox channel leads a list of shows predicted to be of interest to this particular viewer. The viewer may highlight one of the items on the list and then either tune to that show or record it.

The list of suggestions of television programs as shown in FIG. 6B may be presented in a "weighted" fashion list, for example in descending order of the number of times that a particular type of show was watched, as shown. Generation of this list of suggestion is shown in detail in the flowchart of FIG. 5, as described before.

Figures 7, 8:
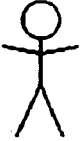
FIG. 7 is another screen display in accordance with another aspect of the invention.
FIG. 8 is another screen display for the invention.

According to another aspect of the invention, such a suggestion list may also be displayed in a dedicated viewing suggestion channel 701 as part of a program guide, as shown in FIG. 7. This dedicated virtual channel would not be a true transmission channel in that it would not correspond to a single transmission channel number such as elements 702 or 703 shown in FIG. 7.

Figure 9:
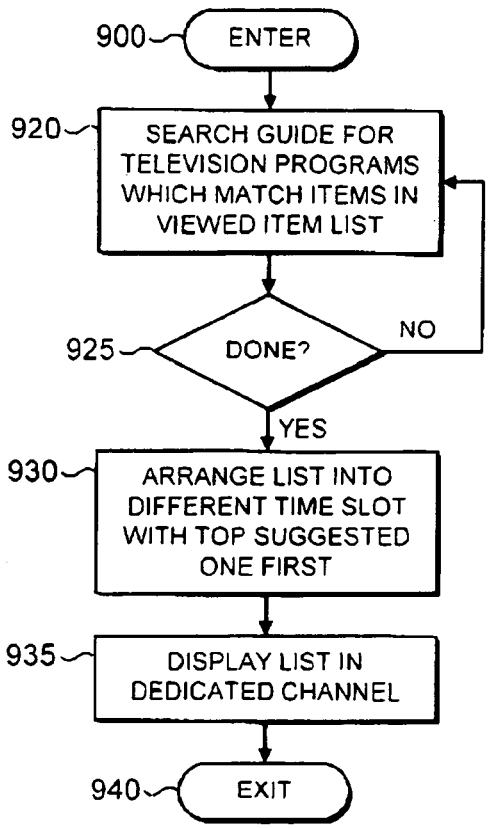
FIG. 9 is another flow chart for showing how suggested programs may be displayed in accordance with an aspect of the invention.

The program event information presented in each time slot (e.g., 704) of the suggestion channel may be, for example, the top viewing suggestion for that time slot based on the suggestion list described previously in FIG. 3 and the determination as shown in flow diagram of FIG. 9. Thus, this channel would consolidate and present programs suggestions from several different channels within one channel row in the guide, independently of the actual transmission channel number. This would allow user to easily locate the suggested event within the program guide itself, rather than may be having to exist the grid guide and go to another portion of the user interface.

The contents of this suggestion channel would be updated as the system gains more data regarding the user's viewing habits and the suggestion list is updated, according to flow diagram of FIG. 3.

In addition, the system provides the options to 1) remove this dedicated channel (hence showing the suggested programs as, for example, a list of programs); 2) have the channel presented only once within the program guide; or 3) have this channel maintaining a constant position at the top or bottom of the currently visible portion of the program guide. These choices may be made by a user interfacing screen shown in, for example, FIG. 8.

Figure 10:
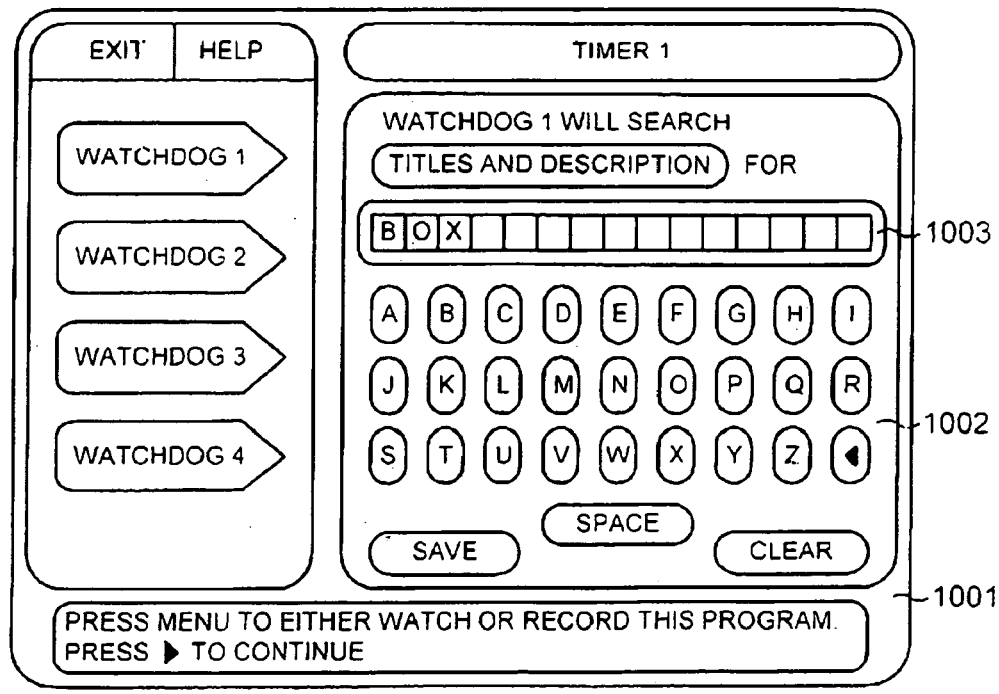
FIG. 10 is an on-screen layout of how a user may enter a search screen.
Figure 11:
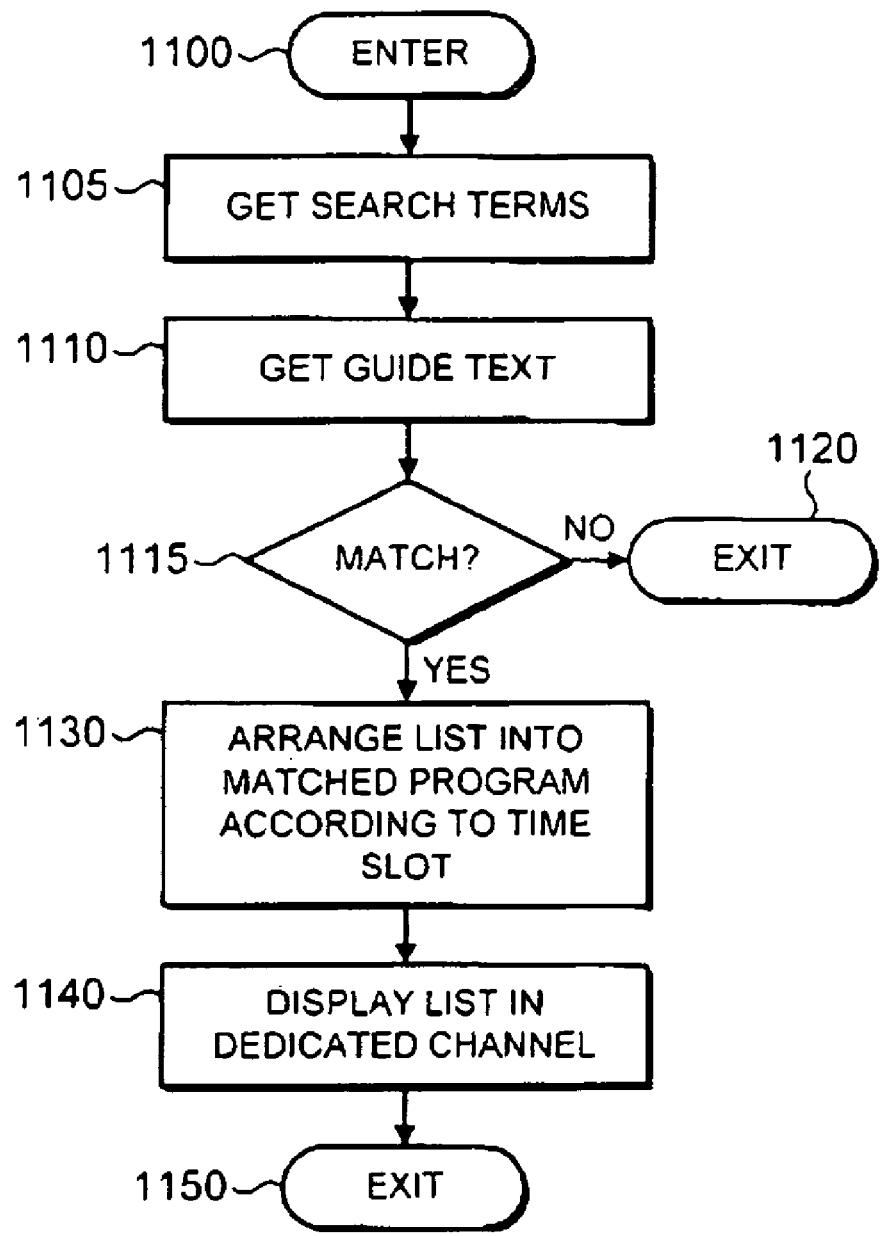
FIG. 11 is a flow chart of how a dedicated channel may be used to display results of a user-entered search.

In another embodiment of the present invention, the user may choose the option 603 on FIG. 6A for entering search criteria to search for specific programs. Once this option 603 is chosen, another screen such as 1001 shown in FIG. 10 is displayed for a user to enter a search criteria or text string. The user may enter a text string in region 1003, using key board 1002 shown on screen 1001. The system will then perform a search of the program guide information to locate the program which has a match or partial match of the entered term, as shown in steps 1100–1115 of the flow diagram of FIG. 11.

Figure 12:
FIG. 12 is an exemplary display of the results of a search.

According to another aspect of the present invention, once a program or programs are found, the result will be displayed in a dedicated channel 1201 shown in FIG. 12, similar to the dedicated channel shown in FIG. 7. The system will first group the matched programs according to their time slot, as shown in step 1130 of FIG. 11. Since, at any given time slot, there may be more than one occurrence of a matched program from each from a different transmission channel, different criteria of determining which program is to be displayed on this dedicated channel may be used. One way is to display the program in a particular time slot by descending or ascent order based on their titles. That is, for example, the title starting with A will be displayed. Another criterion may be to take advantage of the previously described suggestion function, such that a program which matched the user-entered criteria, as well as being considered as the best match according to the suggestion function is displayed.

Figure 13:
FIG. 13 is another example of display according to the present invention.

FIG. 13 shows another exemplary embodiment on how the "result channel" may displayed, so that additional matched programs may be shown. In this example, when a user highlights (using the directional keys on the remote) the first shown program 1301 for a time slot (e.g., 1:00), the system will overlay the rest of the matched programs 1302 in that time slot on the program guide 1300. The user may then scroll through all the matched programs 1302 in the time slot to select any one of the matched programs for that time slot to view or record.

The other choice in the screen display of FIG. 6*a* is "Edit User Information". Suppose the viewer had watched a show called (for purposes of this explanation) "Undesired Show". Further suppose that the viewer did not enjoy the show and does not want that show to influence future predictions. By selecting the "Edit User Information" softkey, the screen of FIG. 6C is brought up for display. The viewer may then highlight the entry for "Undesired Show" and delete it by pressing the "Delete Item" softkey. As noted above, the viewer may also lock a desired entry to keep it from being automatically deleted when space is needed, if that item has a low count, or has not been watched recently.

Figure 4:
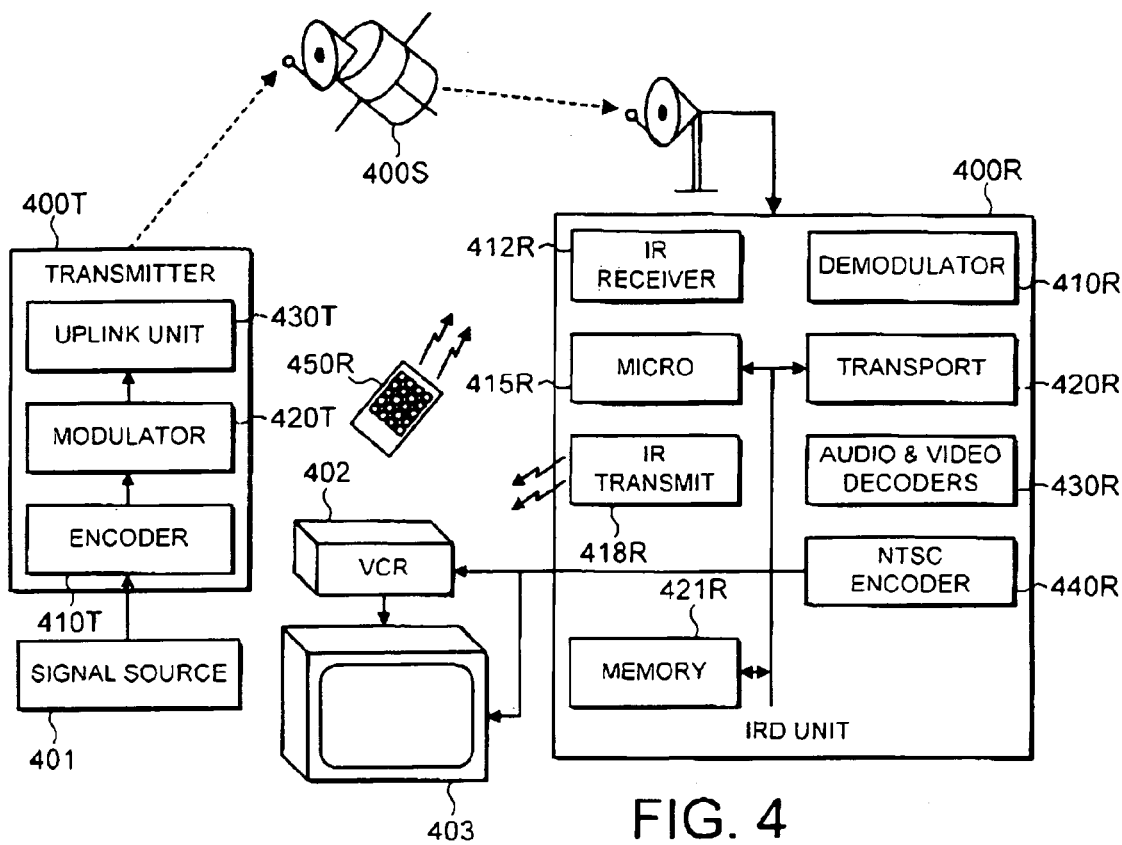
FIG. 4 is an illustration in block diagram form of an apparatus suitable for use with the invention.

As noted above, the channel guide data used by the controller of the subject apparatus to form the above-described interactive, suggestion or searching function may be received from, for example, a television communication system. FIG. 4 shows such a television communication system receiving, for example, communication from a satellite. In this system, a satellite 400S receives a signal representing audio, video, or data information from an earth-based transmitter 400T. The satellite amplifies and rebroadcasts this signal to a plurality of receivers 400R, located at the residences of consumers, via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence.

In such a satellite system, the information necessary to select a given television program is not fixedly-programmed into each receiver but is rather is own-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by a particular transponder. In such a system, it is not possible to tune any channel until the first master program guide is received from the satellite, because the receiver (IRD, or Integrated Receiver Decoder) literally does not know where any channel is located, in terms of frequency and position (i.e. data time slot) within the data stream of any transponder.

A master program guide is preferably transmitted on all transponders with the television program video and audio data, and is repeated periodically, for example, every 2 seconds. The master program guide, once received, is maintained in a memory unit in the receiver, and updated periodically, for example every 30 minutes. Retention of the master program guide allows instantaneous television program selection because the necessary selection data are always available. If the master program guide were to be discarded after using it to select a television program, then a delay of at least two seconds would be incurred while a new program guide was acquired, before any further television program selections could be performed.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver. If the SCID of a particular packet does not match the SCID of the desired television program as listed in the program guide, then that data packet is discarded.

A brief description of system hardware, suitable for implementing the above-described invention, now follows. In FIG. 4, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 410R to demodulate the signal and to decode the error correction data, an IR receiver 412 for receiving IR remote control commands, a microprocessor 415R, which operates interactively with demodulator/FEC unit 410R, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403.

Microprocessor (or microcontroller, or microcomputer) 415R receives infrared (IR) control signals from a user controller or remote control unit 450R for entering user commands, and sends control information to VCR 402 via an IR link 418R. Microprocessor 415R processes control programs according the process flows according to FIGS. 3, 5, 7 and 9. Microprocessor 415R also generates the on-screen display (OSD) signals needed for presenting the interactive sentence, or confirmation sentence, to the user, as shown in the various figures as described before. Microprocessor 415R also receives and interprets cursor key X and Y information in order to control the highlighting of user choices in the on-screen displays.

Although the invention was described with reference to a satellite television system, it is equally applicable to other multimedia, television, VCR or other communication systems, both digital and analog, and capable of receiving communications either from a wired or wireless network, including but not limited to the internet.

The invention claimed is:

1. A method of processing program guide information, comprising the steps of:

recording viewing statistics based on topics;
entering user processing request information;
processing program guide information based on entered user processing request information and the viewing statistics; and
displaying processed result, matching the topics in the recorded viewing statistics, in a dedicated channel, wherein the processed result includes at least two programs in a first time slot, only one of the at least two programs is displayed in the first time slot under the dedicated channel, and others of the at least two programs are also displayed under the dedicated channel directly in response to highlighting the only one of the at least two programs.

2. The method of claim 1 wherein the step of displaying processed result in a dedicated channel further comprising the step of first arranging the processed result into respective time slots.

3. The method of claim 1 wherein the step of entering user processing request information comprising selecting a request for suggesting a program.

4. The method of claim 1 wherein the step of entering user processing request information comprising selecting a search of program guide information based on user-entered text.

5. The method of claim 1 wherein the dedicated channel is displayed along with other channels in a program guide.

6. The method of claim 5, wherein the dedicated channel is always displayed at a predefined position in the program guide.

7. The method of claim 1, wherein the statistic of a topic is the number of times the topic has been viewed.

8. The method of claim 1, wherein the statistic of a topic is the number of times the topic has been viewed more than a predetermined time period.

9. A system for processing program guide information, comprising:
a user controller for entering user processing request information;
a microprocessor for recording viewing statistics based on topics and for processing program guide information based on entered user processing request information and the viewing statistics; and
said microprocessor causing the processed result, matching the topics in the recorded viewing statistics, to be displayed in a dedicated channel, wherein the processed result includes at least two programs in a first time slot, only one of the at least two programs is displayed in the first time slot under the dedicated channel, and others of the at least two programs are also displayed under the dedicated channel directly in response to highlighting the only one of the at least two programs.

10. The system of claim 9 wherein the microprocessor arranges the processed result into respective time slots before the processed result is displayed.

11. The system of claim 9 wherein the entered user processing request information comprises a request for suggesting a program.

12. The system of claim 9 wherein the entered user processing request information comprises a request for a search of program guide information based on user-entered text.

13. The system of claim 9 wherein the dedicated channel is displayed along with other channels in a program guide.

14. The system of claim 13, wherein the dedicated channel is always displayed at a predefined position in the program guide.

15. The system of claim 9, wherein the statistic of a topic is the number of times the topic has been viewed.

16. The system of claim 9, wherein the statistic of a topic is the number of times the topic has been viewed more than a predetermined time period.

* * * * *